US008849843B1

(12) United States Patent
George et al.

(10) Patent No.: US 8,849,843 B1
(45) Date of Patent: Sep. 30, 2014

(54) SYSTEM AND METHOD FOR FACILITATING ASSOCIATING SEMANTIC LABELS WITH CONTENT

(75) Inventors: Bediako George, Washington, DC (US); Syamantak Thakur, New Panvel (West) (IN); Srinivas Murty, Culpeper, VA (US)

(73) Assignee: Ez-XBRL Solutions, Inc., Manassas, VA (US)

( * ) Notice: Subject to any disclaimer, the term of this patent is extended or adjusted under 35 U.S.C. 154(b) by 0 days.

(21) Appl. No.: 13/526,336

(22) Filed: Jun. 18, 2012

(51) Int. Cl.
*G06F 17/30* (2006.01)

(52) U.S. Cl.
CPC ................................ *G06F 17/30908* (2013.01)
USPC ............ 707/758; 755/E17.122; 755/E17.127; 755/E17.137

(58) Field of Classification Search
CPC ................................................ G06F 17/30908
USPC .......... 707/758, 739, 755, E17.122, E17.127, 707/E17.137
See application file for complete search history.

(56) References Cited

U.S. PATENT DOCUMENTS

| | | | |
|---|---|---|---|
| 7,849,030 B2 * | 12/2010 | Ellingsworth | 706/20 |
| 7,917,841 B2 | 3/2011 | Chopin et al. | 715/212 |
| 8,099,370 B2 | 1/2012 | Ohata | 705/76 |
| 8,375,291 B2 * | 2/2013 | Howell et al. | 715/230 |
| 2002/0124018 A1 | 9/2002 | Fifield et al. | 707/512 |
| 2003/0037038 A1 | 2/2003 | Block et al. | 707/1 |
| 2003/0041077 A1 * | 2/2003 | Davis et al. | 707/500 |
| 2005/0004891 A1 | 1/2005 | Mahoney et al. | 707/3 |
| 2006/0184539 A1 * | 8/2006 | Blake et al. | 707/10 |
| 2006/0206878 A1 * | 9/2006 | Uchida | 717/139 |
| 2007/0078877 A1 * | 4/2007 | Ungar et al. | 707/101 |
| 2008/0250157 A1 | 10/2008 | Ohata | 709/236 |
| 2009/0006472 A1 | 1/2009 | Bush et al. | 707/104.1 |
| 2009/0019358 A1 | 1/2009 | Blake et al. | 715/234 |
| 2009/0234784 A1 * | 9/2009 | Buriano et al. | 706/12 |
| 2010/0031141 A1 * | 2/2010 | Summers et al. | 715/239 |
| 2010/0332511 A1 * | 12/2010 | Stockton et al. | 707/759 |
| 2011/0137923 A1 | 6/2011 | Koroteyev et al. | 707/756 |
| 2011/0161333 A1 * | 6/2011 | Langseth et al. | 707/755 |
| 2011/0231384 A1 | 9/2011 | Koroteyev et al. | 707/709 |
| 2011/0270820 A1 | 11/2011 | Agarwal | 707/709 |
| 2012/0303645 A1 * | 11/2012 | Kulkarni-Puranik | 707/756 |
| 2013/0031117 A1 * | 1/2013 | Mandelstein et al. | 707/758 |

* cited by examiner

*Primary Examiner* — Miranda Le
(74) *Attorney, Agent, or Firm* — Pillsbury Winthrop Shaw Pittman LLP

(57) ABSTRACT

The association of semantic labels with content may be facilitated. In particular, the content in the sentences, labels, headers, text, and/or other context that surround a fact may provide information descriptive for a semantic label that has been applied to the sentence and/or fact. By analyzing some of these implicit semantic associations between semantic labels and facts (numeric or otherwise), suggestions for semantic labels may be made for previously labeled or unlabeled facts. The labels that are suggested may include suggestions for concepts, members, and other structured constructs.

12 Claims, 2 Drawing Sheets

SYSTEM AND METHOD FOR FACILITATING ASSOCIATING SEMANTIC LABELS WITH CONTENT

FIELD

The disclosure relates to analysis of structured and unstructured documents to determine associations between structured content and unstructured content to facilitate semantic tags to be applied to content.

BACKGROUND

EXtensible Business Reporting Language is a freely available, open, and global standard for exchanging business information. EXtensible Business Reporting Language may allow the expression of semantic meaning commonly required in business reporting. The language may be based on eXtensible Markup Language and may use the eXtensible Markup Language syntax and related eXtensible Markup Language technologies such as XML Schema, XLink, XPath, and Namespaces. The uses of eXtensible Business Reporting Language include defining and exchanging financial information, such as a financial statement.

Typically, the process of providing corporate filings with semantic structure may require individuals to review the text and apply relevant semantic labels and/or other structural information as appropriate. In some unique situations, the process of providing corporate filings with semantic structure may require going back after the filing document has been created and stored as an electronic document (e.g., a .doc file, a .pdf file, a .txt file, .html file, a .xls file, and/or other electronic document files) to apply semantic labels and/or other structure. Different individuals may apply different semantic labels to the same portions of a filing based on their differing understandings of the eXtensible Business Reporting Language syntax, their differing understandings of the textual content, and/or based on other differences. The process of providing a corporate filing with semantic structure after it has been completed may be manually intensive.

SUMMARY

One aspect of the disclosure relates to facilitating associating semantic labels with content. In particular, the content in the sentences, labels, headers, text, and/or other context that surround a fact, may provide information descriptive for a semantic label that has been applied to the sentence and/or fact. By analyzing some of these implicit semantic associations between semantic labels and facts (numeric or otherwise), suggestions for semantic labels may be made for previously labeled or unlabeled facts. The labels that are suggested may include suggestions for concepts, members, and other structured constructs. In some implementations, a system configured to facilitate the association of semantic labels with content may be configured to execute one or more computer program modules. The one or more computer modules may include one or more of a document module, a fact module, a correlation module, a structured context module, a unstructured context module, a content association module, an analysis module, a suggestion module, and/or other modules.

The document module may be configured to obtain matched sets of documents. An individual matched set of documents may include a structured document and a unstructured document having related content. In some implementations, the structured document may have been created based on the unstructured document. The document module may further be configured to facilitate user entry of content into a document being authored by a user through a graphical user interface presented to the user.

The fact module may be configured to identify numeric instances present in the documents obtained by the document module. For example, responsive to the document module obtaining a first matched set of documents including a first structured document and a first unstructured document, the fact module may identify a first set of numeric instances present in the first structured document and a second set of numeric instances present in the first unstructured document.

The correlation module may be configured to correlate numeric instances in different documents in a common matched set of documents that express matching numbers. For example, responsive to the first set of numeric instances including a first numeric instance expressing a first number and the second set of numeric instances including a second numeric instance expressing the first number, the first numeric instance and the second numeric instance are correlated based on the common expression of the first number. The correlation module may further be configured to correlate numeric instances in the structured documents with numeric instances in the unstructured documents responsive to the numeric instances in the structured documents expressing numbers that are unique on a per document basis. As such, the first numeric instance may be correlated to the second numeric instance responsive to the first number being unique in the first unstructured document and/or the first structured document.

The correlation module may be configured to correlate numeric instances that are not uniquely present in the structured and/or unstructured document of a matched set of documents. For example, to accomplish the correlation of numeric instances that are not uniquely present in the unstructured document, a technique called disambiguation may be used. In this technique, the concept name attached to the numeric instance in the structured document may be deconstructed into its constituent words. The deconstructed numeric instance may be compared to the sentence, header, labels, and/or other markers of the multiple appearances of the numeric instance that are present in the unstructured document. The numeric instance in the unstructured document that has the highest correlation to the constituent words of the concept taken from the structured document may be chosen as the numeric instance to be associated with the concept.

The structured context module may be configured to determine structured contextual information for the individual, correlated numeric instances identified by the fact module in structured documents. For example, responsive to identification of the first set of numeric instance in the first structured document, and responsive to correlation of the first numeric instance with the second numeric instance, the structured analysis module may determine structured contextual information for the first numeric instance. The structured contextual information may include structured structure for the location of the first numeric instance in the first structured document.

The unstructured context module may be configured to determine unstructured contextual information for correlated numeric instances. For example, responsive to correlation of the first numeric instance with the second numeric instance, the unstructured context module may determine unstructured contextual information for the second numeric instance. The unstructured contextual information may include content appearing with the second numeric instance in the first unstructured document.

The context association module may be configured to associate unstructured contextual information with structured contextual information for correlated numeric instances. For example, responsive to correlation of the first numeric instance with the second numeric instance, the structured contextual information for the first numeric instance may be associated with unstructured contextual information for the second numeric instance. Associating structured contextual information for the first numeric instance with unstructured contextual information for the second numeric instance may include associating textual content appearing with the second numeric instance with the structured structure for the first numeric instance.

The analysis module may be configured to analyze associated structured contextual information with unstructured contextual information to determine one or more trends in the associated contextual information. The analysis may comprise a statistical analysis of unstructured contextual information associated with structured contextual information having one or more common features. The one or more common features may comprise one or both of a common dimension and/or a common dimension type.

The suggestion module may be configured to determine suggested semantic labels for content entered to the unstructured document by the user. The suggested semantic labels may be determined based on the analysis performed by the analysis module. For example, the suggested semantic labels may reflect trends between unstructured contextual information and structured contextual information determined by the analysis module. The suggestion module may be configured to cause the graphical user interface to present suggested semantic labels determined by the suggestion module as the content is being entered to the unstructured document by the user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
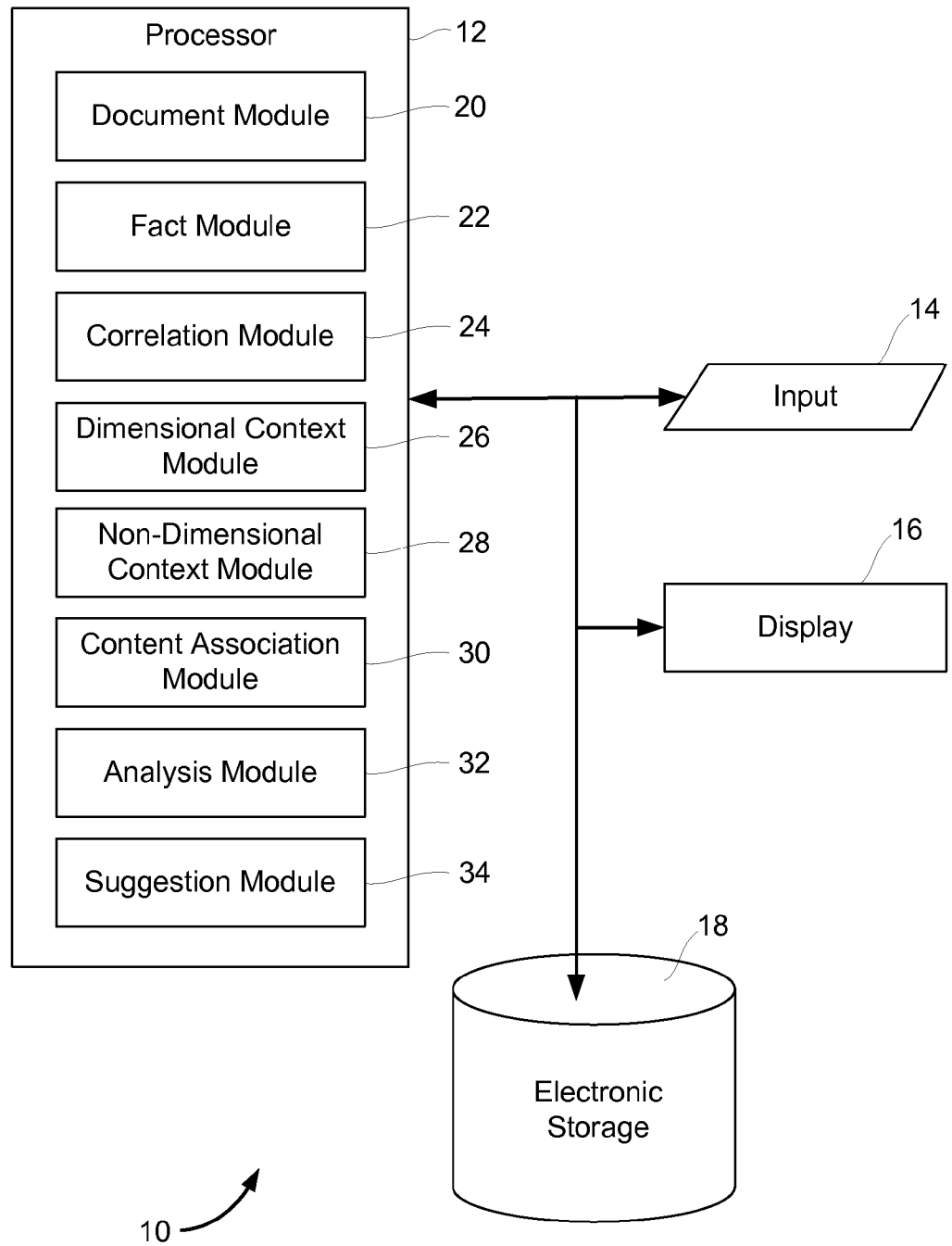
FIG. 1 illustrates a system configured to facilitate associating semantic labels with content.

FIG. 1 illustrates a system 10 configured to facilitate associating semantic labels with content. The semantic labels may be tags associated with a taxonomy. The semantic labels may be used to label, index, categorize, and/or organize the content in other ways. The content may include prose, numerical information, financial information, statistics, accounting tables and/or charts, and/or other information. In some implementations, the semantic labels may be tags associated with the eXtensible Business Reporting Language, Resource Description Framework, HyperText Markup Language, eXtensible Markup Language, and/or other taxonomies or frameworks. As a non-limiting example, system 10 may be configured to facilitate application of semantic labels, such as eXtensible Business Reporting Language tags to financial reporting documents. System 10 may be configured to determine suggestions for semantic labels for content being entered to a document. The suggestions may be determined based on analysis of previously created and/or labeled content or documents. In some implementations, system 10 may include one or more of one or more processors 12, an input device 14, an electronic display 16, electronic storage 18, and/or other components.

Processor 12 may be configured to execute one or more computer program modules. The one or more computer program modules may include one or more of a document module 20, a fact module 22, a correlation module 24, a structured context module 26, a unstructured context module 28, a context association module 30, an analysis module 32, a suggestion module 34, and/or other modules.

Document module 20 may be configured to obtain documents. Obtaining the documents may include receiving documents over a communication connection (e.g., over a network), accessing documents from electronic storage 18, creating documents based on user input through input device 14, and/or obtaining documents in other ways. The documents may include structured documents, unstructured documents, and/or other types of documents.

Structured documents may include documents having content (e.g., tables, charts, structured constructs such as axes, hypercubes, and/or other structured content) that have been labeled with semantic labels, such as tags. In the structured documents semantic labels may include dimensions assigned to the content therein. For example, contextual parameters used to structure content may be defined as dimensions. As a more specific, but non-limiting example, the base eXtensible Business Reporting Language specification defines three dimensions: reporting period, reporting entity (e.g. a company or a division thereof), and a loosely defined reporting scenario (originally intended to distinguish between actual vs. projected facts). The structured information labeling the content, such as the semantic labels, the dimensions, and/or other structured information such as axis or axis member may be referred as structured contextual information. The structured contextual information may include attributes for numeric instances within a structured document. Such attributes may facilitate determination of the numbers expressed by the numeric instances. For example, a single number may be represented as 45,000,000, 45 (million), or 0.45 (billion), among other representations, depending on the context in which it is presented. A numeric instance may include a textual representation of a number (e.g., forty-five million). A structured document may be a document that has been given semantic structure. As such, a structured document may include content (e.g., textual content, and/or other content) and semantic structure (e.g., semantic labels, dimensions, and/or other semantic structure) that has been applied to the content.

Unstructured documents may include content that has not had semantic structure applied to it. been labeled with semantic labels, such as tags, dimensions, and/or other semantic labels. Content within unstructured documents may include string-based content (e.g., words, numbers, and/or other content). The string-based content may be provided in prose, tables, charts, and/or other formats. The context of a numeric instance in such content may include one or more words in a sentence within which the numeric instance appears (e.g., headers, sections, subjects, verbs, adjectives, the whole sentence, a phrase, and/or other groupings of words). The context may extend to adjacent sentences, or even beyond (e.g., a paragraph or section). The context of a numeric instance in such content may include a title of a table, a column heading, other numeric instances within the same table, and/or other information. The context of a numeric instance in a unstructured document may be referred to as unstructured contextual information. By way of example, a unstructured document may include a corporate filing, financial report, or corporate performance report.

The documents obtained by document module 20 may include matched sets of documents. A matched set of documents may include a structured document and a corresponding unstructured document. A structured document that corresponds to a unstructured document may include a structured document that has been created from or based on the unstructured document. As such, the content within the structured document may reflect, overlap with, and/or include the content within the corresponding unstructured document. An exemplary matched set of structured and unstructured documents may include an annual XBRL filing with the US SEC and its unstructured representation in the form of a 10-K filing, respectively.

Fact module 22 may be configured to identify numeric instances present in the documents obtained by document module 20. Identifying a numeric instance may include locating the numeric instance in a document and determining the number expressed by the numeric instance. The number may refer to the numeric value represented by the numeric instance. As has been discussed somewhat above, a single number may be represented in a variety of ways. Fact module 22 may be configured to determine the number expressed by a numeric instance based on the digits or text of the numeric instance itself and/or based on the contextual information for the numeric instance.

Correlation module 24 may be configured to correlate numeric instances in different documents in a matched set of documents obtained by document module 20. This may include correlating numeric instances in a structured document with numeric instances in a corresponding unstructured document. Numeric instances in different documents that express a common number may be correlated. As such, correlation of a first numeric instance in the structured document and a second numeric instance in the unstructured document may be responsive to the first numeric instance and the second numeric instance expressing a first number. The correlation of numeric instances from the structured and unstructured document may be used as common reference points in the structured and unstructured document. These common reference points may be used to identify relationships between the content in the different documents surrounding the reference points (e.g., as described herein).

In some implementations, correlation module 24 may be configured to correlate numeric instances that express numbers that are unique within one or both of the structured document and/or the unstructured document. This may provide enhanced assurance that the correlated numeric instances actually provide common reference points between the documents. For example, if the first number only appears once in the structured document and/or only appears once in the unstructured document, an assumption that the first numeric instance and the second numeric instance refer to the same thing may be a stronger assumption.

Correlation module 24 may be configured to correlate numeric instances that are not uniquely present in the structured and/or unstructured document of a matched set of documents. For example, to accomplish the correlation of numeric instances that are not uniquely present in the unstructured document, a technique called disambiguation may be used. In this technique, the concept name attached to the numeric instance in the structured document may be deconstructed into its constituent words. The deconstructed numeric instance may be compared to the sentence, header, labels, and/or other markers of the multiple appearances of the numeric instance that are present in the unstructured document. The numeric instance in the unstructured document that has the highest correlation to the constituent words of the concept taken from the structured document may be chosen as the numeric instance to be associated with the concept.

Structured context module 26 may be configured to determine structured contextual information for the individual, correlated numeric instances identified by fact module 22 in the structured documents. As such, for a numeric instance in a structured document being correlated with a numeric instance in a unstructured document, structured context module 26 may be configured to determine the structured contextual information. The structured contextual information may be determined from the structured document.

Unstructured context module 28 may be configured to determine unstructured contextual information for the individual, correlated numeric instances identified by fact module 22 in the unstructured documents. For a numeric instance in a unstructured document being correlated with a numeric instance in a structured document, unstructured context module 28 may be configured to determine the unstructured contextual information. The unstructured contextual information may be determined from the unstructured document.

Context association module 30 may be configured to associate unstructured contextual information with structured contextual information for correlated numeric instances. For example, responsive to correlation of the first numeric instance with the second numeric instance, context association module 30 may associate the structured contextual information for the first numeric instance with the unstructured contextual information for the second numeric instance. Such correlations may include associating textual content appearing alongside a numeric instance in a unstructured document with structured structure (e.g., semantic labels, dimensions, and/or other structured structure) for a numeric instance in a structured document.

Analysis module 32 may be configured to analyze associated structured contextual information with unstructured contextual information to determine one or more trends in the associated contextual information. Such analysis may include grouping unstructured contextual information on one or more common structured parameters (e.g., a common dimension, a common semantic label, and/or other common structured parameters), and then performing analysis such as term frequency, inverse document frequency, and/or other analysis. The analysis may include creating a concept map that records the structured structure information, and maps such information to a set of sentences or tables from the unstructured documents. The results of this analysis may be electronically stored (e.g., to electronic storage 18 and/or other electronic storage).

In some implementations, document module 20 may further be configured to cause electronic display 16 to present a graphical user interface to the user. Document module 20 may be configured to facilitate entry and/or editing of human-readable textual content to a unstructured document through the graphical user interface. Entry and/or editing of the textual content may be accomplished through input device 14.

This may include manual entry and/or editing of textual content (e.g., through a keyboard, a mouse, and/or other input devices), entry of stored textual content (e.g., stored in electronic storage 18 and/or other electronic storage), and/or entry or editing in other forms. By way of non-limiting example, the graphical user interface may be similar to or the same as the graphical user interface described in U.S. patent application Ser. No. 13/457,256, filed Apr. 26, 2012, and entitled, "SYSTEM AND METHOD FOR PROVIDING A GRAPHICAL USER INTERFACE THAT FACILITATES APPLICATION OF eXtensible Business Reporting Language TAGS TO TEXTUAL CONTENT" ("the '256 Application"), which is hereby incorporated by reference into the present disclosure in its entirety.

Suggestion module 34 may be configured to determine suggested semantic labels for content entered to a document through the graphical user interface. Such determinations may be made based on stored analysis of analysis module 32. For example, by comparing content being entered to the document through the graphical user interface with unstructured contextual information previously associated with structured contextual information by analysis module 32, suggestion module 34 may identify one or more sets of unstructured contextual information having similarities with the content being entered. Suggestion module 34 may determine the structured contextual information associated with this unstructured contextual information as potentially being applied to the content being entered. This may result in suggestions of semantic labels and/or other structured structure for the content being entered. Suggestion module 34 may be configured to present suggested structured structure to the user entering the content to the document. This presentation may take place via the graphical user interface. For example, suggested structured structure may be presented via the graphical user interface in a manner that is similar to or the same as described in the '256 Application.

Processor 12 is configured to provide information processing capabilities in system 10. As such, processor 12 may include one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may include a plurality of processing units. These processing units may be physically located within the same device, or processor 12 may represent processing functionality of a plurality of devices operating in coordination (e.g., in a client/server architecture, in a peer-to-peer architecture, in a virtualized architecture, and/or in other relationships). Processor 12 may be configured to execute modules 20, 22, 24, 26, 28, 30, 32, and/or 34 by software; hardware; firmware; some combination of software, hardware, and/or firmware; and/or other mechanisms for configuring processing capabilities on processor 12.

It should be appreciated that although modules 20, 22, 24, 26, 28, 30, 32, and/or 34 are illustrated in FIG. 1 as being co-located within a single processing unit, in implementations in which processor xx includes multiple processing units, one or more of modules 20, 22, 24, 26, 28, 30, 32, and/or 34 may be located remotely from the other modules. The description of the functionality provided by the different modules 20, 22, 24, 26, 28, 30, 32, and/or 34 described herein is for illustrative purposes, and is not intended to be limiting, as any of modules 20, 22, 24, 26, 28, 30, 32, and/or 34 may provide more or less functionality than is described. For example, one or more of modules 20, 22, 24, 26, 28, 30, 32, and/or 34 may be eliminated, and some or all of its functionality may be provided by other ones of modules 20, 22, 24, 26, 28, 30, 32, and/or 34. As another example, processor xx may be configured to execute one or more additional modules that may perform some or all of the functionality attributed herein to one of modules 20, 22, 24, 26, 28, 30, 32, and/or 34.

Input device 14 may be configured to provide an interface between system 10 and the user through which the user may provide information to system 10. This enables data, textual content, commands, and/or instructions and any other communicable items, collectively referred to as "information," to be communicated from the user to system 10. Examples of interface devices suitable for inclusion in input device 14 include a keypad, buttons, switches, a keyboard, knobs, levers, a touch screen, and/or a microphone.

It is to be understood that other communication techniques, either hard-wired or wireless, are also contemplated by the present disclosure as input device 14. For example, the present disclosure contemplates that input device 14 may be integrated with a removable storage interface provided by electronic storage 18. In this example, information may be loaded into system 10 from removable storage (e.g., a smart card, a flash drive, a removable disk, etc.) that enables the user(s) to load information to system 10. Other exemplary input devices and techniques adapted for use with system 10 as input device 14 include, but are not limited to, an RS-232 port, RF link, an IR link, modem (telephone, cable or other). In short, any technique for communicating information with system 10 is contemplated as input device 14.

Electronic storage 18 may comprise electronic storage media that electronically stores information. The electronic storage media of electronic storage 18 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 18 may include one or more virtual storage resources (e.g., cloud storage, a virtual private network, and/or other virtual storage resources). Electronic storage 18 may store software algorithms, information determined by processor 12, information received from the user (e.g., through input device 14), and/or other information that enables system 10 to function as described herein.

Figure 2:
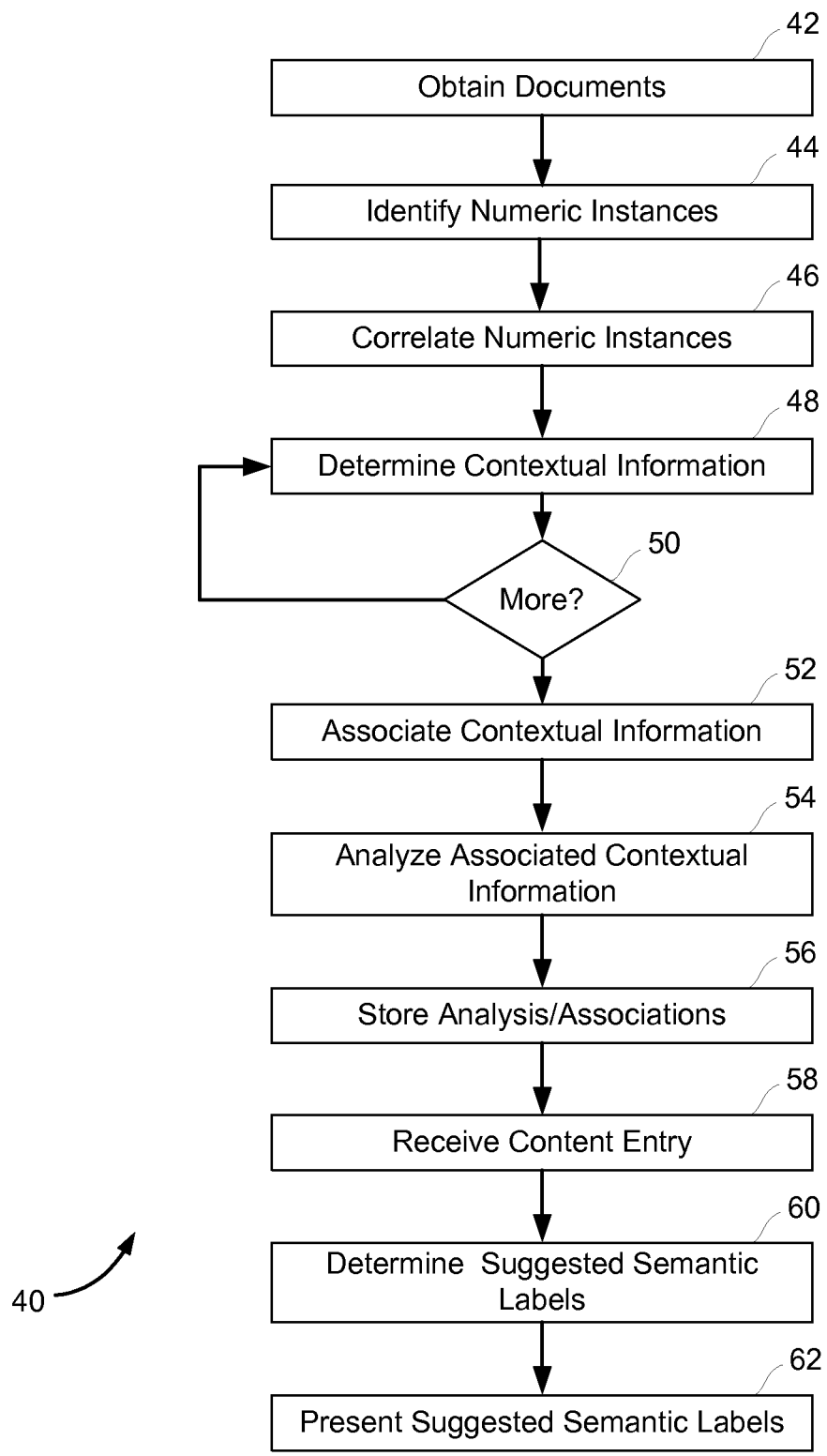
FIG. 2 illustrates a method of facilitating associating semantic labels with content.

FIG. 2 illustrates a method 40 of facilitating the association of semantic tags with content. The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 2 and described below is not intended to be limiting.

In some implementations, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42 a matched set of documents may be obtained. The matched set of documents may include a structured document and a unstructured document. In some implementations, operation 42 may be performed by a document module the same as or similar to document module 20 (shown in FIG. 1 and described herein).

At an operation 44, numeric instances within the structured document and the unstructured document may be identified. This may include identifying a first set of numeric instances in the structured document and a second set of numeric instances in the unstructured document. The first set of numeric instances may include a first numeric instance expressing a first number. The second set of numeric instances may include a second numeric instance expressing the first number. In some implementations, operation 44 may be performed by a fact module the same as or similar to fact module 22 (shown in FIG. 1 and described herein).

At an operation 46, numeric instances from the first set of numeric instances and the second set of numeric instances may be correlated. Correlation of a numeric instance from the first set of numeric instances with a numeric instance from the second set of numeric instances may be made responsive to the numeric instances expressing a common number. For example, the first numeric instance may be correlated with the second numeric instance responsive to the first and second numeric instances expressing the first number. Correlation may further be responsive to the first number being uniquely expressed by the first numeric instance in the structured document and/or by the second numeric instance in the unstructured document. In some implementations, operation 46 may be performed by a correlation module the same as or similar to correlation module 24 (shown in FIG. 1 and described herein).

At an operation 48, contextual information for correlated numerical instances may be determined. This may include determining structured contextual information for the first numeric instance and/or determining unstructured contextual information for the second numeric instance. In some implementations, operation 48 may be performed by a structured context module and/or a unstructured context module the same as or similar to structured context module 26 and/or unstructured context module 28, respectively (shown in FIG. 1 and described herein).

At an operation 50, a determination may be made as to whether there are further correlated numeric instances for which contextual information should be determined. Responsive to a determination that there are further correlated numeric instances for which contextual information should be determined, method 40 may return to operation 48. Responsive to a determination that there are no further correlated numeric instances for which contextual information should be determined, method 40 may proceed to operation 52.

At operation 52, contextual information for correlated numeric instances may be associated. This may include associating the structured contextual information for the first numeric instance with the unstructured contextual information for the second numeric instance. In some implementations, operation 52 may be performed by a context association module the same as or similar to context association module 30 (shown in FIG. 1 and described herein).

At an operation 54, associations between structured contextual information and unstructured contextual information may be analyzed. The analyzed associations may include the association of the structured contextual information for the first numeric instance with the unstructured contextual information for the second numeric instance. Such analysis may include a statistical analysis of the unstructured contextual information associated with structured contextual information having one or more common features (e.g., a common dimension, a common dimension type, a common semantic label, and/or other features). The analysis may identify trends between the associations in the contextual information. In some implementations, operation 54 may be performed by an analysis module the same as or similar to analysis module 32 (shown in FIG. 1 and described herein).

At an operation 56, the associations made at operation 52 and/or the analysis generated at operation 54 may be stored to non-transient electronic storage.

At an operation 58, content being entered to a document may be received through a graphical user interface. The graphical user interface may be provided by a document module the same as or similar to document module 20 (shown in FIG. 1 and described herein).

At an operation 60, suggested semantic labels for the content being entered may be determined based on the information stored at operation 56. In some implementations, operation 60 may be performed by a suggestion module the same as or similar to suggestion module 34 (shown in FIG. 1 and described herein).

At an operation 62, suggested semantic labels may be presented to the user through the graphical user interface. In some implementations, operation 62 may be performed by a suggestion module the same as or similar to suggestion module 34 (shown in FIG. 1 and described herein).

Although it is not illustrated in FIG. 2, it will be appreciated that operations 42, 44, 46, 50, and/or 52 may be iterated over for a plurality of pairs of documents. Such iteration may provide a richer set of data for use in the analysis performed at operation 54. In some implementations, the as iteration occurs analysis performed at operation 54 and stored at operation 56 may be refined through the addition of new data in an ongoing manner.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate associating semantic labels with content, the system comprising:
   one or more processors configured to execute computer program modules, the computer program modules comprising:
   a document module configured to obtain matched sets of documents, wherein individual matched sets of documents include a structured document and an unstructured document having related content;
   a fact module configured to identify numeric instances present in the documents obtained by the document module such that, responsive to the document module obtaining a first matched set of documents including a first structured document and a first unstructured document, the fact module identifies a first set of numeric instances present in the first structured document and a second set of numeric instances present in the first unstructured document;

a correlation module configured to correlate numeric instances in different documents in a common matched set of documents that express matching numbers such that, responsive to the first set of numeric instances including a first numeric instance expressing a first number and the second set of numeric instances including a second numeric instance expressing the first number, the first numeric instance and the second numeric instance are correlated based on the common expression of the first number;

a structured context module configured to determine, responsive to identification of the first set of numeric instances in the first structured document and to correlation of the first numeric instance with the second numeric instance, structured contextual information for the first numeric instance, such structured contextual information labeling the first numeric instance and/or content associated with the first numeric instance in the first structured document, such structured contextual information including one or more of a semantic label, a dimension, or an attribute of the first numeric instance and/or the content associated with the first numeric instance;

a context association module configured to, responsive to correlation of the first numeric instance with the second numeric instance, associate the structured contextual information for the first numeric instance in the first structured document with content appearing with the second numeric instance in the first unstructured document wherein associating structured contextual information for the first numeric instance with content appearing with the second numeric instance includes associating textual content appearing with the second numeric instance with the information labeling the first numeric instance; and an analysis module configured to analyze associated structured contextual information for the first numeric instance and the content appearing with the second numeric instance to determine one or more trends in the associated contextual information, the analysis comprising a statistical analysis of content appearing with the second numeric instance associated with structured contextual information for the first numeric instance having one or more common features, the one or more common features comprising one or both of a common dimension and/or a common dimension type.

2. The system of claim 1, wherein the computer program modules further comprise an unstructured context module configured to determine unstructured contextual information for correlated numeric instances such that, responsive to correlation of the first numeric instance with the second numeric instance, the unstructured context module determines unstructured contextual information for the second numeric instance, the unstructured contextual information including the content appearing with the second numeric instance in the first unstructured document.

3. The system of claim 1, wherein the correlation module is further configured to correlate numeric instances in the structured documents with numeric instances in the unstructured documents responsive to the numeric instances in the structured documents expressing numbers that are unique on a per document bases such that the first numeric instance is correlated to the second numeric instance responsive to the first number being unique in the first unstructured document and/or the first structured document.

4. The system of claim 1, wherein the document module is configured to facilitate user entry of content into a unstructured document being authored by a user through a graphical user interface presented to the user, and wherein the computer program modules further comprise a suggestion module configured to determine suggested semantic labels for content entered to the unstructured document by the user based on the trends determined by the analysis module.

5. The system of claim 4, wherein the suggestion module is further configured to cause the graphical user interface to present suggested semantic labels determined by the suggestion module as the content is being entered to the unstructured document by the user.

6. The system of claim 4, wherein the semantic labels are tags.

7. A computer-implemented method of facilitating the association of semantic labels with content, the method being implemented in a computer system comprising one or more processors configured to execute computer modules, the method comprising:

obtaining a matched set of documents, wherein the matched set of documents includes a structured document and a unstructured document having related content;

identifying numeric instances present in the structured document and the unstructured document such that a first set of numeric instances present in the structured document are identified and a second set of numeric instances present in the unstructured document are identified;

correlating numeric instances in the first set of numeric instances and the second set of numeric instances that express matching numbers such that, responsive to the first set of numeric instances including a first numeric instance expressing the first number and the second set of numeric instances including a second numeric instance expressing the first number, the first numeric instance and the second numeric instance are correlated based on the common expression of the first number;

determining structured contextual information for the first numeric instance responsive to correlation of the first numeric instance with the second numeric instance, such structured contextual information labeling the first numeric instance and/or content associated with the first numeric instance in the first structured document, such structured contextual information including one or more of a semantic label, a dimension, or an attribute of the first numeric instance and/or the content associated with the first numeric instance;

associating content appearing with the second numeric instance in the first unstructured document with the structured contextual information for the first numeric instance in the first structured document, wherein associating the structured contextual information for the first numeric instance with the content appearing with the second numeric instance includes associating textual content appearing with the second numeric instance with the information labeling the first numeric instance;

storing the associations to non-transient electronic storage, and analyzing associated structured contextual information for the first numeric instance and content appearing with the second numeric instance to determine one or more trends in the associated contextual information, wherein the analysis comprises a statistical analysis of content appearing with the second numeric instance associated with structured contextual information for the first numeric instance having one or more common features, and wherein the one or more common features comprise one or both of a common dimension and/or a common dimension type.

8. The method of claim 7, further comprising determining unstructured contextual information for the second numeric instance responsive to correlation of the first numeric instance with the second numeric instance, the unstructured contextual information including the content appearing with the second numeric instance in the first unstructured document.

9. The method of claim 7, wherein correlation of numeric instances in the first set of numeric instance with numeric instances in the second set of numeric instances is performed such that the first numeric instance is correlated with the second numeric instance responsive to the first number being unique in the first unstructured document and/or the first structured document.

10. The method of claim 7, further comprising:
facilitating user entry of content into a unstructured document being authored by a user through a graphical user interface presented to the user; and
suggesting semantic labels for content entered to the unstructured document by the user based on the trends determined by the analysis module.

11. The method of claim 10, further comprising causing the graphical user interface to present suggested semantic labels as the content is being entered to the unstructured document by the user.

12. The method of claim 10, wherein the semantic labels are tags.

* * * * *